Figure 1:
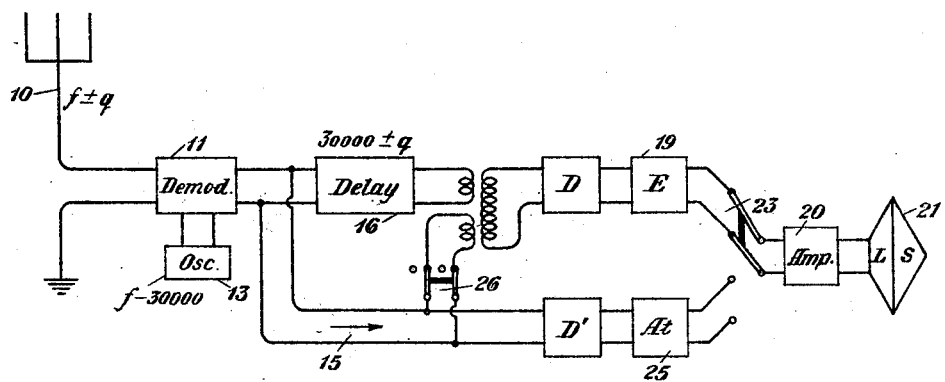

Nov. 17, 1931.  R. K. POTTER  1,831,881

RADIO SIGNAL MEASURING DEVICE

Filed Sept. 12, 1929

INVENTOR
R.K.Potter
BY
ATTORNEY

Patented Nov. 17, 1931

1,831,881

UNITED STATES PATENT OFFICE

RALPH K. POTTER, OF NETCONG, NEW JERSEY, ASSIGNOR TO AMERICAN TELEPHONE AND TELEGRAPH COMPANY, A CORPORATION OF NEW YORK

RADIO SIGNAL MEASURING DEVICE

Application filed September 12, 1929. Serial No. 392,126.

This invention relates to methods and means for detecting and for measuring irregularities in radio frequency signaling, which irregularities give rise to distortions at the receiving station, and more particularly it relates to the detection of irregularities which may be arising in a transmitting station.

In the transmission of radio signals from one station to another, it is to be recognized that portions of the wave arriving at the receiver may, and in general will, have come by two or more appreciably different paths, such for example, as the "ground wave" path and the "sky wave" path. Two such components set up a wave pattern in the neighborhood of the receiving station and elsewhere, which will be determined by the frequency and velocity of the wave and by the difference in wave path. This pattern will change if any one of the three factors changes, and there will be corresponding changes in the signal picked up at the receiving station. Some of the changes which are particularly annoying go under the name of "fading", and may be more due to a shifting of the wave pattern over the countryside in the neighborhood of the receiving station than to increase or decrease in intensity over that whole region. With such a wave pattern, if stationary for example, we recognize that as one moves from place to place he will alternately find positions of relatively strong and relatively weak signals, and certain places will be more favorable under given conditions than other places. If a favorable location should be selected under one condition, then a change in any of the three factors mentioned above would alter the wave pattern and might bring on more favorable or less favorable conditions at the point in question. What actually occurs in nature is that one or more of these factors is changing continually with greater or less amplitude, and thus gives rise to continual increase or decrease in the favorableness of conditions at the particular point in question. These changes obviously may be at a comparatively slow rate or come with a relatively high frequency. They correspond to, and in fact in every sense are, a modulation of the wave signal, and upon detection of such a wave there are currents present in the indicator corresponding to these fluctuations.

While the paths to be followed between two stations and the velocity of the wave are largely, if not completely, beyond control, such is not the case with the frequency generated at the transmitting station, and yet such changes at the transmitter will be effective in producing an apparent modulation of the high frequency wave as picked up on the receiving antenna, thus giving rise to fading effects. In fact, my experimental work indicates that a very considerable amount of the very undesirable fading effects are in some cases due to what I now call frequency or phase modulation of the wave, due to changes in the carrier frequency at the transmitting station.

In general, it is impossible at a remote receiving station to determine whether the distortions in the signal, either in quality or intensity or both, are due to fluctuations at the transmitting station or in the intervening medium. To determine this, then, I propose, in accordance with my invention, to locate a receiving or monitoring station at the transmitting station or so near thereto that the effects due to peculiarities of the medium are not present.

In order to make this invention more clear, it should be pointed out that the shifting of the wave pattern occurs only if there are two or more paths over which the received signal comes. For example, if the carrier frequency and the signal frequency with which it is modulated are represented by $p$ and $q$, respectively, then in the simplest case where the carrier and one sideband only are transmitted the radio signal, as is well known, is made up of two components of frequencies $p+q$ and $p$. As is also well known, when these two components are impressed on a detecting device, there results a signal frequency given by the difference of the two; that is, of the frequency $q$. This is on the assumption that the carrier frequency remains constant. Suppose, however, that it should vary regularly or irregularly by the amount $r$. Then, at any instant of time, the two component waves transmitted will be $p+r+q$ and $p+r$. At the receiving station the difference frequency of $q$ is still received, and it is evident that no substantial effect is observed due to this fluctuation in carrier frequency.

Suppose, now, the signal from the transmitter had divided, traveling by two paths of different lengths such that the two portions do not arrive at quite the same instant of time. Then, at the moment when the two components coming by one path are represented by $p+q$ and $p$, the two coming by the other path would be represented by $p+s+q$ and $p+s$. If these could be received separately the fluctuations would not be evident but actually they are received on one antenna, and in the indicating device there will then be present terms corresponding to all the cross-products, which will give frequencies of $q$, $q+s$ and $q-s$, and thus the presence of the frequency modulation is made evident. Furthermore, in actual practice, there will be additional distortions in quality due to the fact that as these waves over two paths arrive with a continually changing value of $s$, the wave pattern in the neighborhood of the receiver will be shifting continually, giving rise to other effective modulations of the complex wave as received on the antenna.

In my invention, then, in order to detect the changes in carrier frequency, I simulate this two-path condition by dividing the received high frequency message, allowing one portion to pass through a circuit in which there is introduced any desired delay corresponding approximately to that in nature and giving rise at the detector to similar effects. In case there is no changing of carrier frequency at the transmitter this is indicated by a steady condition at the measuring station.

Figure 2:
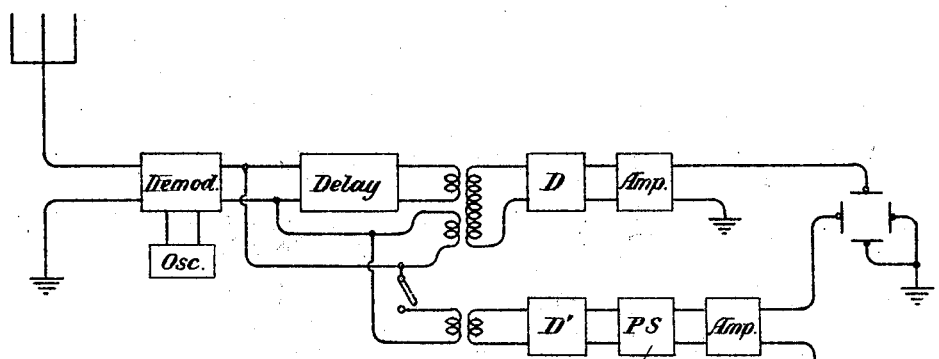
Figure 3:
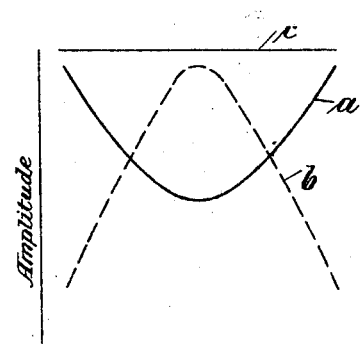

The invention will be better understood by reference to the following specification and the accompanying drawings, in which Figure 1 shows a receiving station adapted for detecting and measuring the results mentioned above, the indication being audible; Fig. 2 shows a modification of Fig. 1, in which the indications are made visual; and Fig. 3 is an amplitude diagram to be used in connection with the description of Fig. 1.

Referring more particularly to Fig. 1, there is shown an antenna 10, to be located at a point proximate to the transmitting station. Associated with this antenna is a demodulating device 11 which on its input receives the antenna current and the current from an oscillator 13. This demodulator is for the purpose of "beating down" the modulated carrier wave to an intermediate frequency which can be controlled more effectively than the high frequency. If, for example, the carrier frequency is $f$ and the message is represented by $f \pm q$, then the oscillator 13 might have a frequency of $f-30,000$. The output of this modulator then contains the wave $30,000 \pm q$. This message is allowed to pass through two paths in parallel, one of these paths 15 containing substantially no delay and the other path 16 having definitely introduced a certain amount of delay, say about 1/2000th of a second. These two components are then recombined on the input circuit of a detector D, and after passing through a frequency equalizer 19 and amplifier 20 are supplied to a loud speaker 21. The effects now produced on the loud speaker 21 are the same as would have been present at a remote station if the signals coming to that station had arrived over two paths one of which required a longer interval of time for transmission, and any frequency modulation at the transmitter would be indicated by corresponding distortions of the signal at the loud speaker. In order to have a standard of comparison for determining whether such distortion is present, I have indicated a path by which the incoming signal may be received in the loud speaker over the undelayed path 15 only. This is accomplished by the throwing of the switch 23 from the position shown in Fig. 1 to the alternative position indicated. By alternately altering the position of the switch 23 it is evident that a comparison of the signal may be made, first where it is received over one path, and second where it is received over two separate paths one containing delay. In order to make the comparison more accurate, I have introduced in the one path of Fig. 1 an equalizer 19 and in the other path an attenuator 25. The need for these is made evident by reference to Fig. 3 in which the ampiltude of the received impulse at the output of the detector D, plotted as a function of audio frequency, is given by the curve $a$, which curve is drawn to indicate that the interference effect produced by the waves coming over the two paths is not the same at all frequencies. Thus, there is introduced a certain amount of distortion due to the delay circuit. The equalizer 19 is constructed of such a character, as shown by curve $b$, that it is the reciprocal or reverse of that of the curve $a$, and when the message has passed through both of these and been suitably amplified, there results the equalized characteristic of curve $c$. It will be understood, of course, that in general such an equalizer introduces attenuation, and for this purpose a corresponding amount of attenuation is introduced in the alternative path, thus bringing the volume of the signal over the two alternate circuits to substantially the same value.

In order to avoid undesirable reactions when the undelayed path alone is being used, I prefer to introduce a switch 26, as shown in the figure, to prevent signals from coming down through the delay circuit and being impressed upon detector D′.

It is sometimes desirable to have indications of the kind described above visual, either because of greater convenience or for the purpose of more quantitative measurements. A circuit for this purpose is shown in Fig. 2, in which the first part of the circuit is the same as shown in Fig. 1, but in the case of the two-path transmission the output of the amplifier instead of going to a loud speaker is impressed upon one pair of plates of an oscillograph tube. A signal coming over this path then causes a spot of light to be drawn out in a line which, on the figure, would be a vertical line. At the same time, by means of a shunt circuit, a portion of the signal which has not been delayed is passed through a detecting device and amplified and impressed on the other pair of plates of the oscillograph, and in general there will be a complex figure visible on the oscillograph screen. A phase shifting device 31 is introduced in the simple undelayed path, and the phase relationship between the two orthogonal motions of the oscillograph screen may then be controlled. If there is no frequency modulation at the transmitting station, then by appropriate shifting of 31 the spot of light on the oscillograph screen will trace out a straight inclined line. If, however, there is any frequency modulation, then the figure immediately becomes complex, the degree of complexity being a measure of the amount or seriousness of the distortion resulting from frequency modulation.

It is apparent that many modifications may be made without departing from the spirit of this invention, and it is to be understood that such modifications are to be considered within the scope of my invention.

What is claimed is:

1. In a radio signalling system, the method of detecting frequency or phase modulation in high frequency transmission which consists in receiving the high frequency signal adjacent to the transmitter point, sending the received signal along two paths, delaying the signal in one path, and comparing the delayed with the undelayed portion.

2. In a radio signaling system, the method of detecting frequency or phase modulation in high frequency transmission which consists in receiving the high frequency signal adjacent to the transmitter point in substantially undistorted form, dividing the signal along two paths, delaying the message in one path, and recombining the two portions into a single message in their new time relationship.

3. In a radio signaling system, the method of detecting frequency or phase modulation in high frequency transmission which consists in receiving a high frequency signal adjacent to the transmitter point, dividing the signal along two paths, introducing delay in one of said paths, recombining the two portions, and detecting the resulting signal.

4. In a radio signaling system, the method of detecting frequency or phase modulation in high frequency transmission which consists in receiving a high frequency signal adjacent to the transmitter point, dividing the signal along two paths, introducing delay in one of said paths, recombining the two portions, detecting the resulting signal, and comparing the signal with one coming over an undelayed path.

5. In a radio signaling system, the method of detecting frequency or phase modulation in high frequency transmission which consists in receiving a high frequency signal adjacent to the transmitter point, reducing the high frequency signal to an intermediate frequency, dividing the signal along two paths, introducing delay in one path, recombining the two portions and detecting to signal frequency.

6. In a radio signaling system, the method of detecting frequency or phase modulation in high frequency transmission which consists in receiving a high frequency signal adjacent to the transmitter point, reducing the high frequency signal to an intermediate frequency, dividing the signal along two paths, introducing delay in one path, recombining the two portions and detecting to signal frequency, impressing the signal on an indicating device, and comparing it with signal received over an undelayed path.

7. In a radio signaling system, the method of detecting frequency or phase modulation in a high frequency transmitted signal which consists in receiving the high frequency signal adjacent to the transmitter point, dividing the high frequency signal along two paths, introducing delay in one path, recombining the two portions and detecting to signal frequency, and equalizing the signal over the signal frequency range.

8. In a radio signaling system, the method of detecting frequency or phase modulation in a high frequency transmitted signal which consists in receiving the high frequency signal adjacent to the transmitter point, dividing the high frequency signal along two paths, introducing delay in one path, recombining the two portions and detecting to signal frequency, equalizing the signal over the signal frequency range, and comparing this received signal visually with that received over an undelayed path.

9. In a radio signaling system, the method of detecting frequency or phase modulation in high frequency transmission which consists in receiving the high frequency message adjacent to the transmitter point, reducing the frequency to an intermediate frequency, dividing the intermediate frequency message along two paths, introducing delay in one, recombining the two portions and detecting to signal frequency, equalizing the message over the signal frequency range, transforming the signal to a visual effect, and comparing it with signal received over an undelayed portion.

10. In a radio frequency signaling system, means for detecting the presence of undesired frequency modulation in the transmitting station which comprises a receiving antenna adjacent to the transmitter station, two paths associated therewith over which the received signal passes, a delay circuit in one path, a detector on which the components from the two paths are impressed, and an indicating device associated with the output of said detector.

11. In a radio frequency signaling system, means for detecting the presence of undesired frequency modulation in the transmitting station which comprises a receiving antenna adjacent to the transmitter station, two paths associated therewith over which the received signal passes, a delay circuit in one path, a detector on which the components from the two paths are impressed, an indicating device associated with the output of said detector, and means whereby the resulting signal may be compared with signal coming over a pure undelayed path.

12. In a radio frequency signaling system, means for detecting the presence of undesired frequency modulation in the transmitting station which comprises a receiving antenna adjacent to the transmitter station, an indicating device, a direct undelayed path to said indicating device, and a second path to said device one portion of which includes a delay device whereby over said path delayed and undelayed signal components may be combined to produce an effect on the said indicating device both paths transmitting the full message.

13. In a radio frequency signaling system, means for detecting the presence of undesired frequency modulation in the transmitting station which comprises a receiving antenna adjacent to the transmitter station, an indicating device, a direct undelayed path to said indicating device, a second path to said device one portion of which includes a delay device whereby over said path delayed and undelayed signal components may be combined to produce an effect on the said indicating device, and means whereby the message over the first path may be compared with that over the second path.

14. In a radio frequency signaling system, means for detecting the presence of undesired frequency modulation in the transmitting station which comprises a receiving antenna adjacent to the transmitter station, a demodulating device associated with said antenna to "beat" the signal to an intermediate frequency, an indicating device, a direct undelayed path to said indicating device, and a second path to said device one portion of which includes a delay device whereby over said path delayed and undelayed signal components may be combined to produce an effect on the said indicating device both paths transmitting the full message.

15. In a radio frequency signaling system, means for detecting the presence of undesired frequency modulation in the transmitting station which comprises a receiving antenna adjacent to the transmitter station, a demodulating device associated with said antenna to "beat" the signal to an intermediate frequency, an indicating device, a direct undelayed path to said indicating device, a second path to said device one portion of which includes a delay device whereby over said path delayed and undelayed signal components may be combined to produce an effect on the said indicating device, and means whereby the message over the first path may be compared with that over the second path.

In testimony whereof, I have signed my name to this specification this 10th day of September, 1929.

RALPH K. POTTER.